United States Patent [19]
Vail, Jr.

[11] 3,867,905
[45] Feb. 25, 1975

[54] CANINE SECURITY LEASH
[76] Inventor: Richard W. Vail, Jr., 925-0 Fairview Ave., Arcadia, Calif. 91006
[22] Filed: Aug. 7, 1973
[21] Appl. No.: 386,370

[52] U.S. Cl................................. 119/109, 119/106
[51] Int. Cl............................................ A01k 27/00
[58] Field of Search ............ 119/106, 110, 111, 109

[56] References Cited
FOREIGN PATENTS OR APPLICATIONS
| 26,068 | 4/1931 | Australia | 119/106 |
| 838,093 | 6/1960 | Great Britain | 119/106 |

Primary Examiner—Louis G. Mancene
Assistant Examiner—J. N. Eskovitz
Attorney, Agent, or Firm—LeBlanc & Shur

[57] ABSTRACT

The leash comprises a chain formed of a plurality of links and having a plastic-sheathed loop at one end of fixed size and adapted to be grasped by an individual. The opposite end of the chain is secured within a lock housing. The lock housing also has a passageway for slidably receiving a portion of the chain intermediate its ends whereby a variably sized loop is formed at the opposite end of the leash. The lock includes a locking element for locking the intermediate portion of the chain within the passageway of the lock housing thereby adapting the latter loop for releasable locking engagement about the neck of a dog. To tether a dog to a fixture, the leash is disposed about the fixture and the lock end is inserted through the fixed loop and pulled taut. The variable sized loop is then fitted about the dog's neck and the loop is sufficiently tightened to secure the dog to the leash. A key is inserted into the lock housing and the locking element locks the chain to the lock housing. The dog is thus secured to the leash and the leash is secured to the fixture.

9 Claims, 4 Drawing Figures

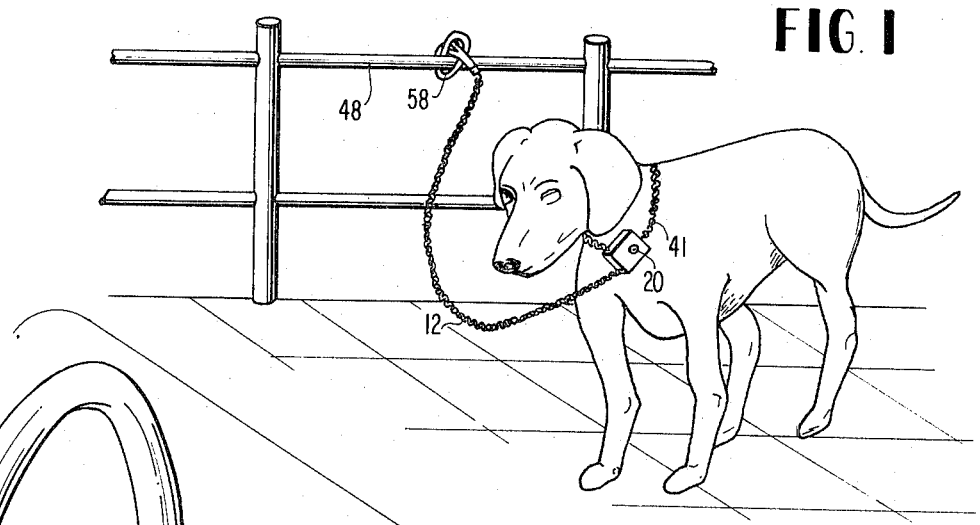
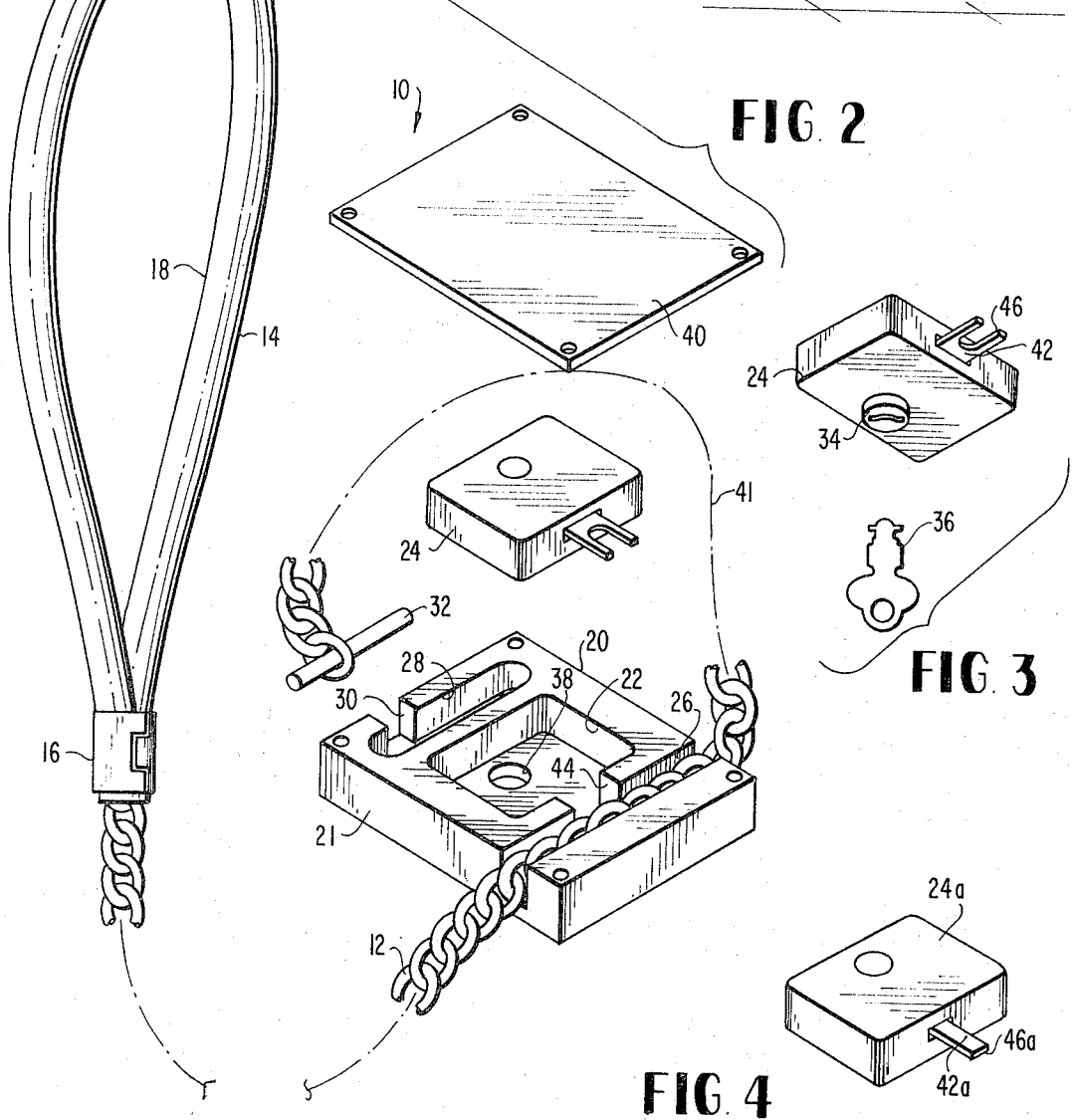

CANINE SECURITY LEASH

The present invention relates to a canine security leash and particularly relates to a dog tether particularly useful for releasably securing the dog on the tether to a permanent fixture.

Conventional dog leashes usually have a fixed loop at one end of a chain or the like forming a handle for the leash. The opposite end of the leash is normally provided with a clip which can be readily attached to and detached from a keeper element carried by a dog collar secured about the dog's neck. While leashes of this type are convenient for use since the leash can be readily secured to and detached from the dog's collar, such leashes do not offer any security whatsoever from theft of the dog when the dog is left tethered to a fixture by the leash. For example, conventional leashes can be readily secured to a fixture simply by tying a knot. However, an individual prone to take the dog need only untie the knot or release the clip from the keeper element on the dog's collar in order to remove the dog. The problem of preventing an unauthorized individual from taking the dog, particularly when the dog is tethered to a fixture and ostensibly secured against theft, has become an increasing problem in view of the increasing occurrences of dog thefts. Consequently, it has been found desirable to tether the dog in such a manner that only an authorized individual can remove the dog from the leash or remove the leash from the fixture to which the dog is tethered. Concomitantly, it is necessary that any such security leash for a dog must not constitute an encumberance on the dog, must be portable, be adaptable for all sizes of dogs, and of course, must have the capacity for ready, easy and quick utilization.

The present invention provides a novel and improved canine security leash which solves many of the problems associated with providing security against theft of a dog left tethered to a permanent fixture and provides a security leash having various advantages in construction, mode of application and use in comparison with prior type leashes and other security type devices for animals. Particularly, the present invention provides a security leash comprised of a tether in the form of a chain having a plurality of links. One end of the chain is provided with a loop of fixed size which is encased within a plastic tubing to provide a handle for the tether. The opposite end of the chain is received within a recess in a lock housing and secured thereto by a pin received through the end link of the chain. The lock housing also has a passageway for slidably receiving a portion of the chain intermediate the fixed loop and the end thereof fixed to the lock housing. Thus, a second loop is formed at the opposite end of the chain and which loop can be adjusted in size. The lock housing also includes a key-operated locking element which is selectively engageable with the portion of the chain received within the lock housing passageway to prevent the chain from moving through the passageway. One form of locking element hereof has a pair of locking projections which are received within links of the chain in registry therewith whereby endwise movement of the chain through the lock housing passageway if precluded. In another form, the locking element frictionally engages against the chain within the passageway to prevent movement of the chain within the passageway.

In order to tether the dog to a fixture and acquire the benefits of the security aspects of the present leash, the leash is first disposed about the fixture and the end carrying the lock is disposed through the fixed loop and drawn tight. The loop at the opposite end of the chain is adjusted in size to fit about the dog's neck and then drawn securely about the dog's neck such that the dog's head cannot be withdrawn through the loop. By turning the key in the lock housing, the locking element is moved to engage the chain in the lock housing passageway whereby the leash is releasably locked about the dog's neck. It will be appreciated that, without a key, an unauthorized individual cannot unfasten or release the leash from about the dog's neck. Moreover, the fixed loop at the opposite end of the chain, while of a size sufficient to provide a handle when the tether serves as a leash, is too small to pass the dog and the lock through the loop. Thus, the leash is also secured to the fixture and unauthorized removal of the dog from the leash or the leash from the fixture is prevented.

Accordingly, it is a primary object of the present invention to provide a novel and improved canine security leash.

It is another object of the present invention to provide a novel and improved canine security leash wherein a dog may be releasably tethered to a fixture in a manner to prevent its unauthorized removal.

It is still another object of the present invention to provide a novel and improved canine security leash wherein the leash is readily disposed about a permanent fixture and readily and easily releasably locked about the dog's neck whereby the leash cannot be unauthorizedly removed from the fixture or the dog unauthorizedly removed from the leash.

It is a further object of the present invention to provide a novel and improved canine security leash which is economical in construction, adapted to readily fit all sizes of dogs, is comfortable for the dog to wear, and can be readily, easily and quickly utilized to releasably lock the dog to a permanent fixture in a manner preventing unauthorized removal of the dog.

These and further objects and advantages of the present invention will become more apparent upon reference to the following specification, appended claims and drawings wherein:

FIG. 1 is a schematic view of a canine security leash constructed in accordance with the present invention and illustrating a dog tethered by such leash to a permanent fixture;

FIG. 2 is an exploded perspective view of the various elements of the security leash hereof;

FIG. 3 is a perspective view of a lock for use with the security leash hereof; and FIG. 4 is a perspective view of a further form of lock for use with the security leash hereof.

Referring now to the drawings, particularly to FIG. 2, there is illustrated a canine security leash constructed in accordance with the present invention and generally designated 10. Leash 10 comprises a tether in the form of a chain 12 having a plurality of links. One end of the chain is formed into a loop 14 with the distal end of the chain being secured to an intermediate portion of the chain by a metal clip 16. Loop 14 is encased within a plastic tubing 18 to provide a more comfortable handle for the leash, the tubing 18 being secured in the loop of chain 14 by clip 16.

A lock housing 20 is provided comprised of a metal block 21 having a central recess 22 for receiving a lock 24, a passageway 26 on one side of and extending through housing 20, and a recess 28 on the opposite side of the housing. An opening 30 is provided on one side of the housing 20 for access into recess 28. An intermediate portion of chain 12 is slidably received within passageway 26, the distal end of the chain being disposed through opening 30 into recess 28. A pin 32 is carried within recess 28 and extends through the end link of the chain to secure the end of the chain to lock housing 20. As illustrated in FIG. 3, the lock 24 has a depending tumbler 34 for receiving a key 36. Tumbler 34 is received within an opening 38 in lock housing 20 when the lock 24 is received in recess 22 thereof. A cover plate 40 is suitably secured to block 20, for example by rivets at the four corners of the cover plate and block, to close the recesses 22, 28 and passageway 26 and thereby maintain the lock 24 as well as the intermediate portion of the chain and the chain end within the lock housing.

It will be appreciated that the passage of the intermediate portion of the chain through the passageway 26 and the securement of its end in the recess 28 forms a loop 41 at the end of the chain remote from handle 14. Loop 41 may be varied in size simply by sliding the chain through passageway 26. This loop is adapted to be received about the neck of a dog and consequently, by permitting such loop to vary in size, the leash can be utilized with dogs of all sizes.

The lock 24 illustrated in FIG. 3 is keyoperated and has a locking element 42. When lock 24 is received within housing 20 in recess 22, the key-operated locking element is adapted to be extended or retracted through an opening 44 in block 21 into and out of engagement with the intermediate portion of chain 12 in passageway 26. In this form of lock 24, locking element 42 carries a pair of spaced projections 46 adapted to engage in adjacent links when locking element 42 is projected into passageway 26. By such engagement, it will be appreciated that the chain within passageway 26 can be releasably locked against sliding movement whereby the size of loop 41 can be fixed. By withdrawing locking element 42 by actuation of the key 36 in tumbler 34, the projections 46 may be removed from the links of the chain in passageway 26 and the loop enlarged or decreased in size as desired simply by sliding the chain through passageway 26.

Referring to FIG. 4, there is illustrated another form of lock 24a. In this form, the locking element 42a comprises a projection 46a adapted to frictionally bear against the chain within passageway 26 to engage the chain against the wall of passageway 26 remote from projection 42a. In this manner, the chain is frictionally engaged within passageway 26 whereby the size of the loop about the dog's neck is also fixed.

In order to tether the dog to a permanent fixture such that the dog cannot be unauthorizedly removed, the leash is first disposed about the fixture, for example the rail 48 illustrated in FIG. 1. The end of the chain containing the lock and the variably sized loop 41 is then inserted through loop 14 whereby a slip loop 50 encompasses rail 48. The key-actuated lock 24 is then operated such that locking element 42 is withdrawn from passage 26 whereby the intermediate portion of the chain is slidable therein and slidable to increase or decrease the size of the loop 41 formed thereby at the opposite end of the chain. This loop is then passed about the dog's head and tightened such that the tether cannot thereafter be removed from the dog. When the appropriate size of loop is obtained, the key is turned to extend the locking element 42 or 42a, depending upon which lock is utilized, to lock the chain to the lock housing. In the form illustrated in FIG. 3, projections 46 engage within the links of the chain within the passageway 26 and prevent movement of the chain relative to the lock housing. In the embodiment of FIG. 4, the locking element 42a frictionally clamps the chain against the opposite wall of passageway 26 and similarly prevents movement of the chain relative to the housing.

When the foregoing has been accomplished, it will be appreciated that, by virtue of the lock, the dog cannot be removed from the tether. Also, since the size of loop 14 is only sufficient such that an individual can grasp it in order to utilize the tether in a similar manner as a conventional dog leash is utilized, the dog and chain cannot be passed through loop 14. As a result, only an individual having key 36 can remove the dog from the leash and the leash from rail 48.

It will thus be appreciated that the objects of the present invention are fully accomplished in that the dog can be readily and easily secured to and released from the permanent fixture in a minimum amount of time. Also, the leash hereof is useful with all sizes of dogs and provides a safe, effective and comfortable tether for preventing unauthorized removal of the dog when the security aspects of the leash hereof are invoked.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A canine security leash comprising a tether having a predetermined length, means forming and maintaining a loop at one end of said tether thereby providing a handle for said leash, a lock for preventing unauthorized removal of the canine from the leash including a lock housing, means for securing said lock housing to the opposite end of said tether, said lock housing having a passageway for slidably receiving a portion of said tether intermediate the end thereof secured to said lock housing and its opposite end thereby forming a second loop of variable size at the opposite end of said leash, the opposite end portions of the tether forming said second loop being coupled directly to said lock with the size of said second loop being determined by the distance along the tether between the intermediate tether portion in said passageway and said opposite tether end, said lock housing carrying a locking element releasably engageable with said tether in said passageway to lock said tether against movement in said passageway, thereby adapting said second loop for releasable locking engagement about the neck of a canine, said locking element when engaged with said tether in said passageway preventing unauthorized change in the size of said second loop.

2. A leash according to claim 1 wherein said tether comprises a chain formed of a plurality of links, said locking element including a projection engageable within a selected one of said chain links to lock said chain in said passageway against substantial sliding movement.

3. A leash according to claim 1 wherein said locking element includes a projection frictionally engageable with the tether in said passageway to lock said tether in said passageway against sliding movement.

4. A leash according to claim 1 wherein said tether comprises a chain formed of a plurality of links, said lock housing having an elongated recess and an opening into said recess, a pin in said recess engaging through a link of said chain receivable through said opening to secure said lock housing to said chain end.

5. A leash according to claim 1 wherein said tether comprises a chain formed of a plurality of links, the chain forming said first mentioned loop having a covering of plastic tubing.

6. A canine security leash according to claim 1 including a key cooperable with said lock to remove said locking element from engagement with said tether in said passageway.

7. A canine security leash comprising a tether having a predetermined length, means forming and maintaining a loop at one end of said tether thereby providing a handle for said leash, a lock housing, means for securing said lock housing to the opposite end of said tether, said lock housing having a passageway for slidably receiving a portion of said tether intermediate the end thereof secured to said lock housing and its opposite end thereby forming a second loop of variable size at the opposite end of said leash, said lock housing carrying a locking element releasably engageable with said tether in said passageway to lock said tether against movement in said passageway thereby adapting said second loop for releasable locking engagement about the neck of a dog, said lock housing comprising a metal block having a recess, a lock disposed in said recess and carrying said locking element, said passageway being defined by a recess in said block, a cover plate, and means for securing said cover plate to said block to close said recesses.

8. A leash according to claim 7 wherein said tether comprises a chain formed of a plurality of links, said lock housing having an elongated recess and an opening into said recess, a pin in said recess engaging through a link of said chain receivable through said opening to secure said lock housing to said chain end, said cover plate also closing the latter mentioned recess.

9. A canine security leash comprising a chain formed of a plurality of links and having a predetermined length, means forming and maintaining a loop at one end of said chain thereby providing a handle for said leash, a lock housing, means for securing said lock housing to a portion of said chain adjacent its opposite end, said lock housing having a passageway for slidably receiving another portion of said chain adjacent said opposite end thereby forming a second loop of variable size at the opposite end of said leash, said lock housing carrying a locking element releasably engageable with said chain in said passageway to lock said chain against movement in said passageway thereby adapting said second loop for releasable locking engagement about the neck of a dog, said locking element including a projection engageable within a selected one of said chain links to lock said chain in said passageway against substantial sliding movement, said lock housing comprising a metal block having a recess, a lock disposed in said recess and carrying said locking element, said passageway being defined by a recess in said block, a cover plate, and means for securing said cover plate to said block to close said recesses.

* * * * *

UNITED STATES PATENT OFFICE
CERTIFICATE OF CORRECTION

Patent No. 3,867,905             Dated February 25, 1975

Inventor(s) Richard W. Vail, Jr.

It is certified that error appears in the above-identified patent and that said Letters Patent are hereby corrected as shown below:

Column 3, line 29, "key operated" should read --key-operated--.

Column 3, line 50, "26 to", should read --26 and to--.

Signed and Sealed this fifth Day of August 1975

[SEAL]

Attest:

RUTH C. MASON
Attesting Officer

C. MARSHALL DANN
Commissioner of Patents and Trademarks